Jan. 11, 1944.   B. BOULOGNE ET AL   2,338,896
PNEUMATIC SHOCK ABRORBER
Filed Oct. 12, 1940   2 Sheets-Sheet 1

Inventors,
Baltus Boulogne &
Antonie Pieter Boulogne
By Allllcombe
Attorney.

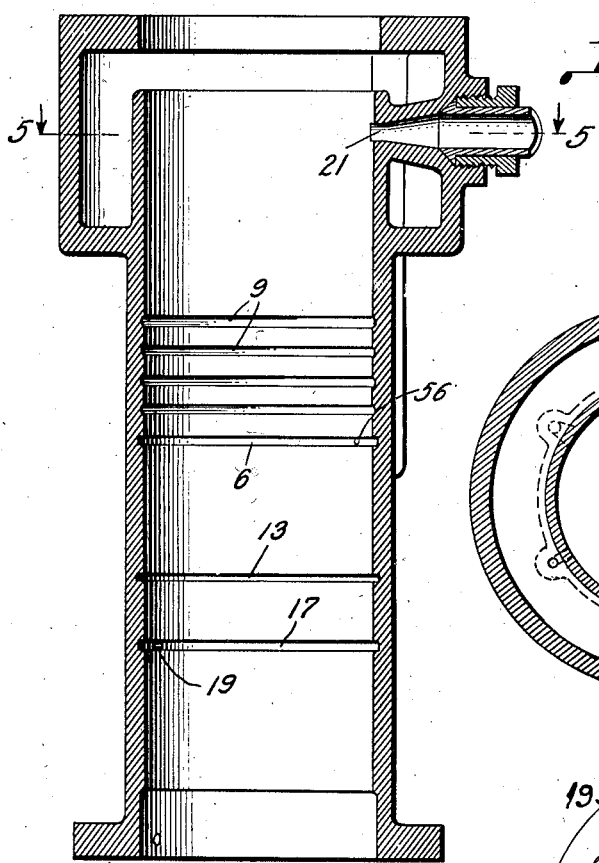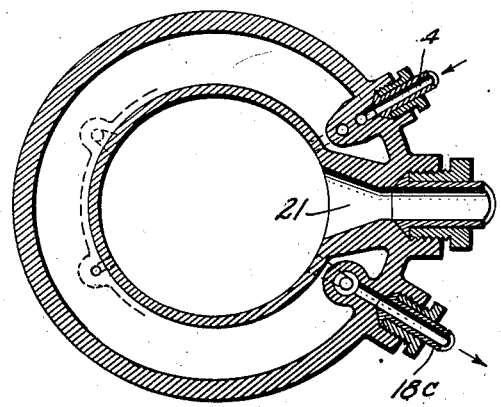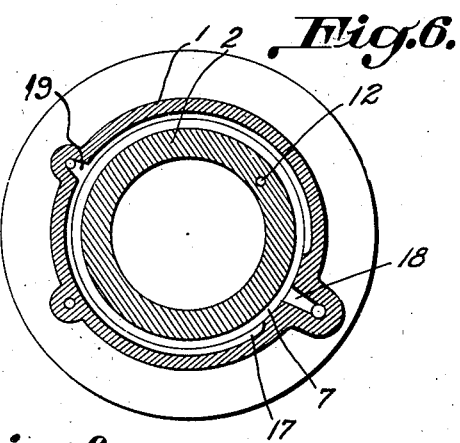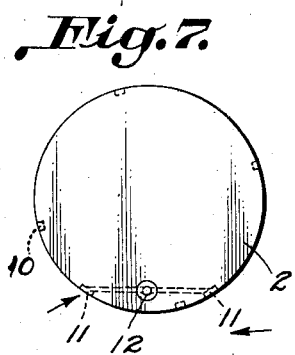

Patented Jan. 11, 1944

2,338,896

UNITED STATES PATENT OFFICE 2,338,896

PNEUMATIC SHOCK ABSORBER

Baltus Boulogne and Antonie Pieter Boulogne, Pengalengan, near Bandoeng, Java, Netherland East Indies; vested in the Alien Property Custodian Application October 12, 1940, Serial No. 361,007
In the Netherlands May 11, 1940

5 Claims. (Cl. 267—65)

This invention relates to pneumatic shock absorbers for automobiles and other vehicles.

Apparatus such as pneumatic shock absorbers have been announced under U. S. Patent No. 1,544,850, Messier and several others, but have not come into use, which shows that although there has for a long time been great interest in this subject, an equipment meeting practical requirements has not yet been found.

According to this invention, the desired degree of usefulness can be attained by the application of an air cushion arrangement of the kind as hereinafter described, examples of which are given in the accompanying drawings, Figs. 1 to 8, inclusive.

Fig. 4 is a vertical section similar to Fig. 3 on line 4—4, but with the piston and inner cylinder removed.

Fig. 5 is a horizontal section on line 5—5 of Fig. 4.

Fig. 6 is a horizontal section on line 6—6 of Fig. 3.

Fig. 7 is a top view of the piston.

Fig. 8 shows parts of a piston and cylinder of a somewhat different construction.

Figures 1, 3:
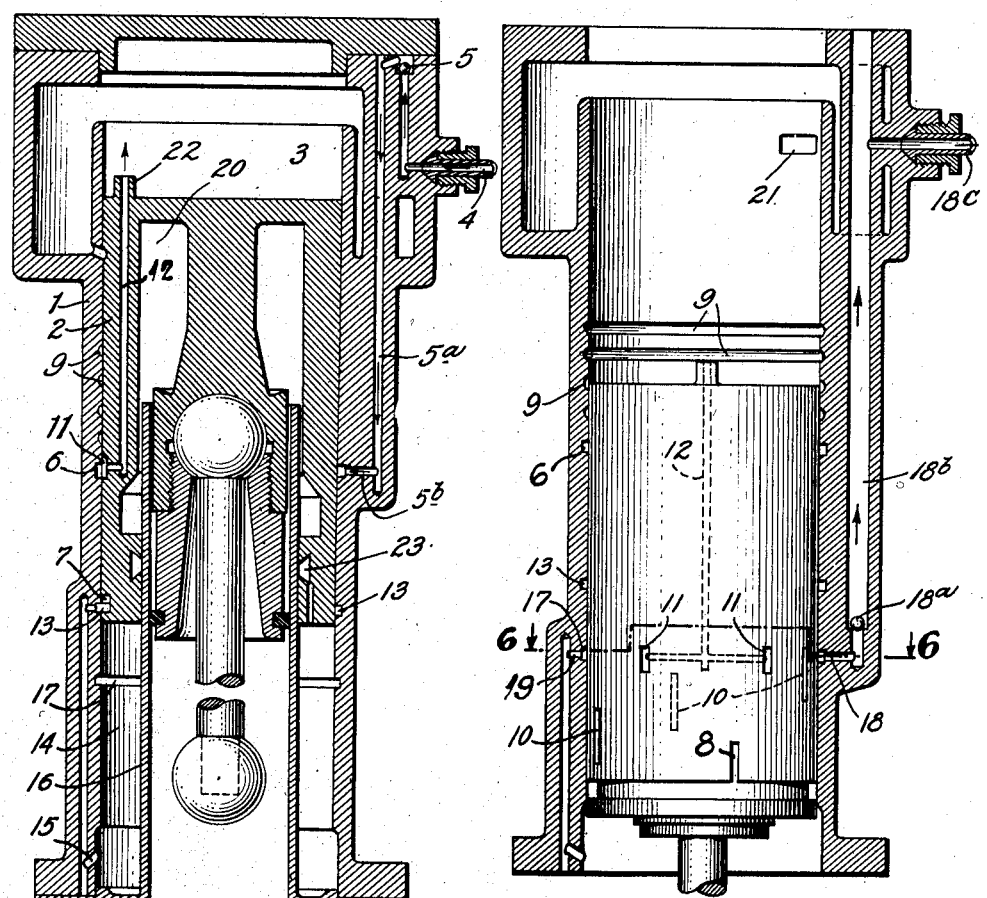
Fig. 1 is a vertical section along the line 1—1 of Fig. 2.
Fig. 3 is a vertical section on line 3—3 with the piston illustrated in elevation.
Figure 2:
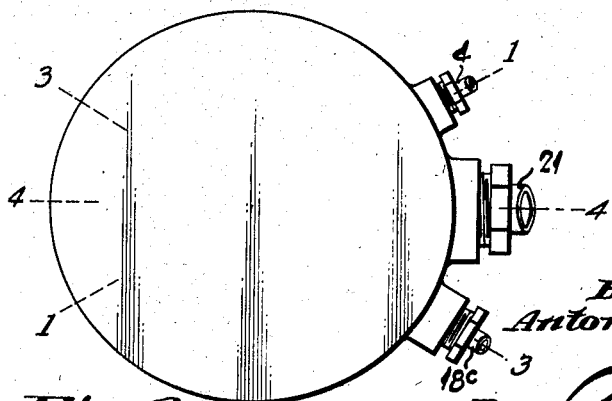
Fig. 2 is a top view.

This shock absorber is so constructed that during repeated and sudden decrease of the load on the air cushion, such as takes place when making sharp turns and when repeatedly ascending and descending hills, the piston does not move too far away from the cylinder top and does not knock against the bottom of the cylinder. Furthermore, the operation of the apparatus is such that when applied to an automobile the quantity of air forming the air-cushion is maintained even when passengers leave the car for a short while. The quantity of air only comes into conformity with the decreased load (without any knocking of the piston) if the car should proceed empty. Furthermore, when driving on uneven roads the lubricating matter on the piston will not escape in its entirety with the discharge of air.

A simple form of construction can be applied.

The apparatus consists of a cylinder 1 containing in it a piston 2, and operates as follows: In the cylinder chamber 3 there is maintained a cushion of compressed air and the pressure thereof is dependent upon the load which the car puts on the apparatus, hereinafter to be called the "bearer."

The quantity of air in the bearer (supply and discharge) is regulated by the position of the piston in the cylinder. The supply of air to the bearers may, for example, be from a pump or if desired from an interposed supply reservoir. If in chamber 3 there is not sufficient air pressure to bear the weight of the car, the piston will be pushed toward and substantially into contact with the cylinder top by the car's weight and compressed air will then pass in the direction of the arrow through the canal 4. The valve 5 will then be opened and this air will reach the annular groove 6 in the inner wall of the cylinder through channel 5a and port 5b and from there flow into the groove 7 of the piston. When the piston is pushed against the cylinder top the aforesaid grooves 6 and 7 communicate with each other and also with the short, axially-extending groove 8. This short groove 8, by means of the annular groove 9 in the cylinder, gives access to one of the small grooves 10 in the piston, so that this groove 10 thus gets filled with compressed air. This air then continues its passage through an adjacent groove 9 in the cylinder and a small groove 10 in the piston, and finally reaches the short grooves 11 whence the air passes through canal 12 into the chamber 3. In this chamber the compressed air pushes the piston in the cylinder downward, and the weight of the car is borne by the air cushion being formed. The supply of compressed air to the chamber 3 stops as soon as the short grooves 11 have passed groove 6 due to the downward movement of the piston in the cylinder.

Lubricating matter—hereinafter to be called "oil"—can be supplied to chamber 3 and to the piston either with the compressed air or separately. As the piston does not remain in the same place in the cylinder during a journey, its movements will repeatedly establish communication between grooves 11 and 6 and, consequently, it will assume a somewhat lower average position. Each time the short grooves 11 reach the groove 13, which goes over the entire circumference of the cylinder, air from chamber 3 will escape through 12, 11 and 13 into chamber 14, and any excess of oil on the piston will also be drawn along and, blown in that direction through the canal 15, serve for lubrication of the tube 16, so that leakage along this tube is prevented. The average position of the piston 2 in the cylinder 1 will then be—as shown approximately in the drawings—between the point where contact between the short groove 11 and the groove 6 is broken, and the point where contact is made between the short groove 11 and the groove 13. If during travel the piston going downward moves so far in the cylinder that the short grooves 11 pass groove 13 completely and these small grooves are thereby covered, some air will again be let out of chamber 3 as soon as the short grooves 11, going farther downward, reach groove 17.

The arrangement can also be effected in such a manner that discharge of air from 3 can only take place when 11 communicates with 13, while discharge may also be made to take place through, for instance, more than two consecutive grooves and divided over several periods of time. The groove 17 not extending over the entire circumference of the cylinder, as shown in Fig. 6, prevents openings 18 and 19 from communicating with each other in any other way than through the groove 7 made for that purpose in the piston. In view of this break in the groove 17 the two short grooves 11 in the piston are offset from one another axially of the piston, so that contact with 17 is insured by at least one of these two short grooves. If desired, suitable means may be employed to prevent the piston from turning during its operation.

The air and oil in chamber 14 are pumped out by the upward and downward movement of the piston, and in order to prevent leakage of oil along tube 15 the average pressure maintained in this chamber is preferably somewhat lower than atmospheric pressure. This pressure in chamber 14 can as desired be regulated by various means. The method used here to maintain an average pressure in chamber 14 lower than atmospheric pressure is as follows: When air and oil have entered chamber 14 during the downward movement of the piston, the pressure thus caused here will escape through the opening 18 as soon as the piston in its upward movement uncovers this opening. When the piston again moves downward this opening is again covered, and the pressure in 14 increases somewhat; consequently, when the groove 7 around the piston connects opening 18 (which opening is equipped with a non-return valve 18a, Fig. 3) with the opening 19 some air will again escape from chamber 14 through the opening 18, valve 18a, canal 18b to discharge outlet 18c and will draw along with it some oil out of 14. When the piston moves downward and the opening 18 has been covered, its further descent causes compression in chamber 14 and knocking of the piston against the bottom of this chamber is thereby prevented. Moreover, chamber 20, for example, can function either in conjunction with chamber 14 or independently, instead of it, while if desired other chambers can be made to replace or co-operate with one or both of the aforesaid chambers by adopting a different form of construction.

As shown in the example, Fig. 8, the openings 18 and 19a can be so located that they cannot be connected to each other by the groove 7, which groove can then be differently shaped and be, for instance, larger. The pumping from chamber 14 then takes place as follows: When after an upward movement of the piston (whereby the opening 18 is uncovered and discharge has taken place from 14) the opening 18 is again covered by the downward movement of the piston, pressure will be created in 14 by the piston going farther downward. Thus as soon as 7 comes into contact with opening 19 this groove 7 will be filled with air and oil flowing in there from 14, and when in the following upward movement of the piston groove 7 communicates with opening 18, the contents of this groove being under some pressure a part of it will flow into the opening 18.

A greater part of the weight of a car will be borne by the rear axle when driving uphill than on a horizontal road, and the air cushions in the rear bearers will then consequently be more depressed. The air supply then automatically comes into operation and more air enters into chambers 3 of these bearers. The front bearers, however, will have less weight to carry when driving uphill, and if the load be considerably decreased a part of the compressed air will be allowed to escape from these bearers into chambers 14. When the pistons have come sufficiently downward below their middle position in the cylinder, the opening 18 will be covered, so that the air allowed into chamber 14 cannot escape but will press against the lower end of the pistons, thereby preventing their knocking against the bottom of the cylinders. When driving down a hill the air in the chambers 14 of the rear bearers will act in the same way. In a similar manner the apparatus helps to keep the car in a horizontal position when making a turn. During a somewhat long climb or descent the air cushions in the bearers automatically adjust themselves to their load in the same way as takes place on a horizontal road. If from a fully loaded car equipped with shock-absorbers, as above described, all passengers get out at the same time, whereby the quantity of air in the bearers is no longer in conformity with the weight of the empty car, the pistons 2 will assume such a low position in the cylinders 1 that air flows from chambers 3 into the chambers 14 until this air in these chambers 14, pressing against the lower end of the pistons, has again brought the latter so high up in the cylinders that the small grooves 11 are no longer in communication with the groove 13. Especially in the case of Fig. 8, there can be no discharge from 14 through 18 unless the pistons move up and down; therefore, if the car is not riding no air will escape from the bearers. If now the passengers get into the car again, the air present in the bearers is still in conformity with the weight of the loaded car. Should the car drive off empty, the movement of the pistons will cause a repeated discharge of air from chamber 14 through 18, and the air-filling in the bearers will in a short time be in conformity with the weight of the empty car. Should a number of passengers now get into the car, the air-filling in the bearers will not be sufficient to carry the loaded car, but replenishment will take place very quickly, because as long as the air-filling in the bearers is insufficient the pistons in the cylinders find themselves in such a position that the supply of air—which for the purpose of quick replenishment may be effected from a reservoir—takes place without interruption.

The compressed air in chamber 3 of the cylinder 1 will, if a wheel of the car goes over a raised spot (bump) in the road, be further compressed and partly driven out through the opening 21. When the piston in its movement further upward covers the opening 21, only the air shut up in the upper part of the cylinder will be further compressed, the pressure of which then quickly increases and prevents the piston from knocking against the top of the cylinder. The opening 21 is in communication with an air chamber whose size determines the degree of resiliency of the apparatus. The height of the small pipe 22 determines the thickness of the oil layer on the piston. The grooves 9 in the cylinder are of great importance to the sealing off and lubrication of the piston when it is in its middle position. In order to decrease the possibility of leakage of oil along the tube 16, one or more grooves 23, with or without oil outlet holes, can be made in the inner wall of the piston 2 which slides over this tube 16. The air discharge from chamber 3 can, if desired, be so led that a part of this discharged air enters chamber 14, while another part of it follows another path.

Compressed air can be obtained from, for instance, a motor-driven pump, wherewith under influence of the difference between the pressure in the delivery piping and that in the suction piping of said pump, the inlet to the suction piping is automatically shut off by a sliding valve, or other such device, as soon as the desired pressure has been reached.

A spring device can, if desired, be placed between the upper cover of the cylinder and the top of piston 2, or in some other place and manner, so that in case the bearer should contain insufficient air the car can ride on and be supported by such spring device.

It is also evident that various changes, modifications, variations and substitutions might be resorted to without departing from the spirit and scope of the invention.

We claim:

1. A pneumatic spring device for vehicles, comprising a cylinder and a piston slidably arranged therein, one of said elements being connected to the vehicle body and the other to a lower supporting body, one end of said piston being spaced from the corresponding end of said cylinder to form a cushion chamber containing a gas under pressure, the other end of said piston being spaced from a wall at the other end of said cylinder to form an auxiliary chamber, a channel in said piston communicating with said cushion chamber and with a port in the side wall of said piston, a channel in the wall of said cylinder communicating with said auxiliary chamber and with a port in the side wall of said cylinder, said ports being adapted to register to establish connection between said cushion chamber and said auxiliary chamber in a first relative position of said cylinder and piston and to cut off communication therebetween in other positions, an outlet from said auxiliary chamber controlled by a nonreturn valve and communicating with a port in the side wall of said cylinder, and a conduit in said piston adapted in a second relative position of said piston and said cylinder to establish communication between the port communicating with said auxiliary chamber and the port communicating with said outlet, whereby as the end of said piston moves away from the end of said cylinder to enlarge the main chamber the discharge of gas from the auxiliary chamber is shut off before communication is established between said cushion chamber and said auxiliary chamber.

2. A pneumatic spring device for vehicles, comprising a cylinder and a piston slidably arranged therein, one of said elements being connected to the vehicle body and the other to a lower supporting body, one end of said piston being spaced from the corresponding end of the cylinder to form a cushion chamber containing gas under pressure that supports the vehicle body, the other end of said piston being spaced from a wall at the other end of said cylinder to form an auxiliary chamber, means establishing communication between said cushion chamber and said auxiliary chamber in one relative position of said cylinder and piston and cutting off such communication in other positions, means comprising cooperating ports in said piston and cylinder for venting said auxiliary chamber to an outlet in a relative position of said cylinder and piston spaced from the position in which communication is established between said cushion chamber and said auxiliary chamber.

3. A pneumatic spring device for vehicles, comprising a cylinder and a piston slidably arranged therein, one of said elements being connected to the vehicle body and the other to a lower supporting body, one end of said piston being spaced from the corresponding end of the cylinder to form a cushion chamber containing gas under pressure that supports the vehicle body, the other end of said piston being spaced from a wall at the other end of said cylinder to form an auxiliary chamber, means admitting entry of lubricating matter to said cushion chamber, means connecting said cushion chamber to said auxiliary chamber in one relative position of said cylinder and piston to discharge lubricating matter and gas from said cushion chamber, valve means controlled by relative movement of said cylinder and said piston to discharge gas from said auxiliary chamber to an outlet at one relative position of said cylinder and piston, said valve means being closed when said cylinder and piston are in such relative position as to establish connection from said cushion chamber to said auxiliary chamber.

4. A pneumatic spring device for vehicles, comprising a cylinder and a piston slidably arranged therein, one of said elements being connected to the vehicle body and the other to a lower supporting body, one end of said piston being spaced from the corresponding end of the cylinder to form a cushion chamber containing gas under pressure that supports the vehicle body, the other end of said piston being spaced from a wall at the other end of said cylinder to form an auxiliary chamber, a channel in said piston opening into said cushion chamber above the level of the surface of said piston, whereby a layer of lubricating matter will be retained on said surface, said channel communicating with a port in the wall of said piston, said cylinder having a channel communicating with said auxiliary chamber and with a port in said cylinder registering in a first relative position of said cylinder and piston with the port in said piston, said cylinder having an outlet port connected to said auxiliary chamber in a second relative position of said cylinder and piston spaced from said first position, whereby upon relative movement of said cylinder and piston to decrease the volume of said cushion chamber connection of said auxiliary chamber to said outlet port is shut off before communication from said cushion chamber to said auxiliary chamber is established.

5. A pneumatic spring device for vehicles, comprising a cylinder and a piston slidably arranged therein, one of said elements being connected to the vehicle body and the other to a lower supporting body, one end of said piston being spaced from the corresponding end of the cylinder to form a cushion chamber containing gas under pressure that supports the vehicle body, the other end of said piston being spaced from a wall at the other end of said cylinder to form an auxiliary chamber, channels in said cylinder and said piston communicating with ports in the engaging faces of said cylinder and piston effective to establish communication between said cushion chamber and said auxiliary chamber in a first relative position of said cylinder and piston and to cut off such communication in other positions, said cylinder and piston having cooperating ports effective to establish connection from said auxiliary chamber to an outlet in a second relative position of said cylinder and piston, said ports registering intermittently upon repeated relative movement between said cylinder and piston to vary the pressure in said auxiliary chamber.

BALTUS BOULOGNE.
ANTONIE PIETER BOULOGNE.